(12) United States Patent
Kylstra

(10) Patent No.: US 8,336,904 B2
(45) Date of Patent: Dec. 25, 2012

(54) MODULAR WHEELCHAIR WITH IN-LINE CHASSIS

(75) Inventor: Bart Kylstra, San Francisco, CA (US)

(73) Assignee: Daedalus Wings, Inc., San Francisco, CA (US)

( * ) Notice: Subject to any disclaimer, the term of this patent is extended or adjusted under 35 U.S.C. 154(b) by 354 days.

(21) Appl. No.: 12/235,149

(22) Filed: Sep. 22, 2008

(65) Prior Publication Data

US 2009/0078482 A1 Mar. 26, 2009

Related U.S. Application Data

(60) Provisional application No. 60/994,675, filed on Sep. 21, 2007.

(51) Int. Cl.
*B62B 7/06* (2006.01)
(52) U.S. Cl. .......................... 280/647; 280/287; 280/650
(58) Field of Classification Search .................. 180/214, 180/65.1; 280/647, 650, 287, 47.38
See application file for complete search history.

(56) References Cited

U.S. PATENT DOCUMENTS

| | | | |
|---|---|---|---|
| 3,605,929 A * | 9/1971 | Rolland ........................ | 180/208 |
| 4,362,311 A | 12/1982 | Bergman | |
| 4,861,058 A * | 8/1989 | Cresswell ..................... | 280/278 |
| 5,020,624 A * | 6/1991 | Nesterick et al. ............ | 180/210 |
| 5,421,598 A | 6/1995 | Robertson et al. | |
| 5,921,338 A * | 7/1999 | Edmondson ............... | 180/65.51 |
| 6,135,222 A | 10/2000 | Furukawa | |
| 6,220,382 B1 | 4/2001 | Kramer, Jr. et al. | |
| 6,378,642 B1 * | 4/2002 | Sutton .......................... | 180/208 |
| 6,439,331 B1 * | 8/2002 | Fan ............................... | 180/208 |
| 6,659,488 B1 * | 12/2003 | Beresnitzky et al. ......... | 280/282 |
| 6,793,248 B1 * | 9/2004 | Sung ............................. | 280/781 |
| 7,044,249 B2 * | 5/2006 | Fan ............................... | 180/208 |
| 7,080,847 B2 | 7/2006 | Chao | |
| 7,364,182 B2 * | 4/2008 | Jane Santamaria .......... | 280/642 |
| 7,571,926 B2 * | 8/2009 | Huang ........................ | 280/647 |
| 7,591,479 B2 * | 9/2009 | Golias .......................... | 280/647 |
| 7,832,755 B2 * | 11/2010 | Nolan et al. ................. | 280/642 |
| 2008/0211206 A1 * | 9/2008 | Thorne et al. ................ | 280/650 |
| 2009/0014985 A1 * | 1/2009 | Huang ........................ | 280/647 |
| 2009/0078482 A1 * | 3/2009 | Kylstra ....................... | 180/65.1 |

FOREIGN PATENT DOCUMENTS

FR 2601241 A1 1/1988

* cited by examiner

*Primary Examiner* — Jeffrey J Restifo
(74) *Attorney, Agent, or Firm* — Schneck & Schneck; David M. Schneck

(57) ABSTRACT

A modular wheelchair comprises a number of different modules that include a chassis module with frame members substantially centered along a center plane through the chassis, so that the chassis is able to lay flat when the modules are dissembled. The chassis is connected to a drive module by a single plug/receiver mechanical coupling that may include opposite end geometries. When the plug is in a seated position within the receiver, first end geometries of the two components mate mechanically to resist radial movement, while the second end geometries mate mechanically to resist both radial movement and rotation about an axis of the coupling. Additionally, axial movement in one direction is resisted, with the coupling oriented to apply gravitational force to resist axial movement in the opposite direction. The same arrangement may be used for a seat module.

21 Claims, 10 Drawing Sheets

MODULAR WHEELCHAIR WITH IN-LINE CHASSIS

CROSS-REFERENCE TO RELATED APPLICATION

This application claims priority from co-pending U.S. provisional application Ser. No. 60/994,675, filed Sep. 21, 2007.

TECHNICAL FIELD

The invention relates generally to wheelchairs and more particularly to modularity of a wheelchair.

BACKGROUND ART

Traditionally, pushrim propulsion has been used in powering a wheelchair. Pushrims are provided adjacent to the main wheels of the wheelchair, allowing a person to apply force to the pushrims in order to move the wheelchair forwardly or rearwardly. A concern with the use of pushrim propulsion is that the poor human-to-chair biomechanics result in inefficiencies, and sometimes injury. Users of pushrim wheelchairs may suffer from Repetitive Strain Injuries (RSI) of the wrist and shoulders.

As an alternative to pushrim propulsion, other approaches for manually driving wheelchairs include the use of levers which are "rowed" and the use of handcycles which are "peddled." Such approaches avoid some of the ergonomic and inefficiency shortcomings of pushrim propulsion.

As an alternative to manual wheelchairs for users with limited dexterity and strength, electric wheelchairs are increasing in popularity. Electric wheelchairs include one or more motors attached to drive wheels for control by the wheelchair user. A joystick may be located for easy access by the user to dictate forward and rearward movement, as well as steering. A battery is carried by the wheelchair for providing power to each motor. Particularly for the aged, electric wheelchairs significantly increase mobility.

The transportation of wheelchairs presents a considerable challenge. The battery and motors of an electric wheelchair increase the weight and the volume concerns. Vehicles may be adapted specifically for transporting wheelchairs, such as carrier vans and lifts. However, such vehicles are not always available. Moreover, the transportation challenges remain for public transportation, such as the use of buses, trains, and airplanes. Air travel requires that the size and weight of the wheelchair remain manageable. Often, manual wheelchairs are designed to be folded. Reducing the size of an electric wheelchair is more problematic.

One method of addressing the transportation challenge is to construct the wheelchair as a number of interconnecting modules that can be assembled and disassembled as needed. U.S. Pat. No. 6,220,382 to Kramer, Jr. et al. describes a powered wheelchair with a separate center frame. The center frame includes a center bar and components welded to the bar, including a support for a battery and a crossbar to which a pair of threaded knobs are attached. The threaded knobs are used to secure a drive assembly in position along the bar after the bar has been passed through a tube of the drive assembly for attachment with a footrest. Two rear stabilizing wheels are attached to the end of the bar opposite to the footrest.

While prior art techniques for forming modular wheelchairs operate well in allowing users to readily disassemble the chair, further advances are available, particularly in the areas of reducing the difficulty of disassembly and enabling a more compact and readily carried disassembly of modules.

SUMMARY OF THE INVENTION

A modular wheelchair is formed of a number of different modules, including a chassis with frame members that are substantially centered along a center plane through the chassis, so that if the width of each frame member is disregarded the chassis may be considered to be two-dimensional (length and height). The wheelchair includes a number of other modules, including a drive assembly and a seat assembly. A second pair of wheels, typically caster wheels, are provided and may be included as components of another module (i.e., a wheels module).

In one preferred embodiment, a releasable interconnection of the chassis to the drive assembly is achieved by use of a single plug/receiver mechanical coupling. Since there is a single such coupling, the attachment of the chassis to the drive assembly may be accomplished with relative simplicity. The receiver is configured such that insertion of the plug to a seated position resists lateral movement of the plug relative to the receiver and resists relative rotation between the plug and the receiver. This may be achieved by providing the receiver with different first and second end geometries which fully engage compatible end geometries of a plug when the plug reaches its seated position. For example, the plug and receiver may have surface features that contact in a compatible manner to provide the resistance to lateral and rotational movement about various axes. Moreover, when the plug is in its seated position the receiver, the mechanical connection restricts further insertion in one axial direction, while gravitational forces restrict movement in the opposite axial direction.

While the plug/receiver mechanical coupling has more than one preferred embodiment, in each coupling, one end geometry of the plug mates mechanically with an end geometry of the receiver to provide radial constraint, and the second end geometry of the plug mates mechanically with the second end geometry of the receiver to provide radial constraint and constraint of rotation about an axis through the first and second ends. At least one of the two ends mates mechanically to constrain axially in one direction (while orientation ensures gravitational force achieves constraint axially in the opposite direction). Additionally, at least one of the two ends of the coupling provides contact with its constraining surfaces in all constraining directions, when the plug is in the seated position.

In a preferred embodiment, the drive assembly includes drive wheels at opposite ends of a tubular housing. The drive wheels are operatively coupled to different motors, typically via gearboxes, with the motors and gearboxes located within the tubular housing and the gearboxes having axes in angular alignment with the axes of the drive wheels. In some embodiments, the angular alignment is one in which the gearboxes and drive wheels are coaxial (such as with planetary gearboxes), while other embodiments provide an angular alignment in which the axes are parallel (such as in the use of spur gears).

As noted, each frame member of the chassis is substantially centered with a plane through the center of the chassis. Each frame member may be tubular, accommodating transportation and storage of the chassis, since the chassis is able to lay flat. The plug/receiver mechanical coupling to the drive assembly is at an end of one of the frame members. At the other end or at the end of a second frame member, a mechanical coupling for releasable connection to the seat module utilizes the same plug/receiver approach. Moreover, the same or a different tubular frame member may include a telescoping extension that is extendable and retractable relative to a generally horizontal chassis portion. In some embodiments, a quick-release coupling is used to connect a wheels assembly to the telescoping extension. Thus, by extending and retracting the telescoping extension, the wheel base of the wheelchair may be varied to increase stability, which is particularly important for lightweight wheelchairs. A second quick-release coupling may be used to connect a footrest to the telescoping extension. Both quick-release couplings may include a coupling pin that is dimensioned to pass through aligned holes within the relevant components.

The seat module includes a seat portion and a back portion. The two portions are preferably connected by at least one hinge that is enables the seat to be folded. More significantly, the seat module includes structure for enabling the angle of the back portion to be adjusted on the basis of a user's preference.

Other features include the ability to house the battery for powering the motors within one of the tubular frame members of the chassis. Another feature is the use of a latch to secure a plug within a receiver. For example, while the plug/receiver mechanical coupling of the chassis to the drive assembly operates well when combined with the weight of a person within the seat, the latch is useful during times in which the wheelchair is lifted while unoccupied and during times in which unusual forces are encountered, such as impact with an object or travel across particularly uneven terrain.

DETAILED DESCRIPTION

Figure 1:
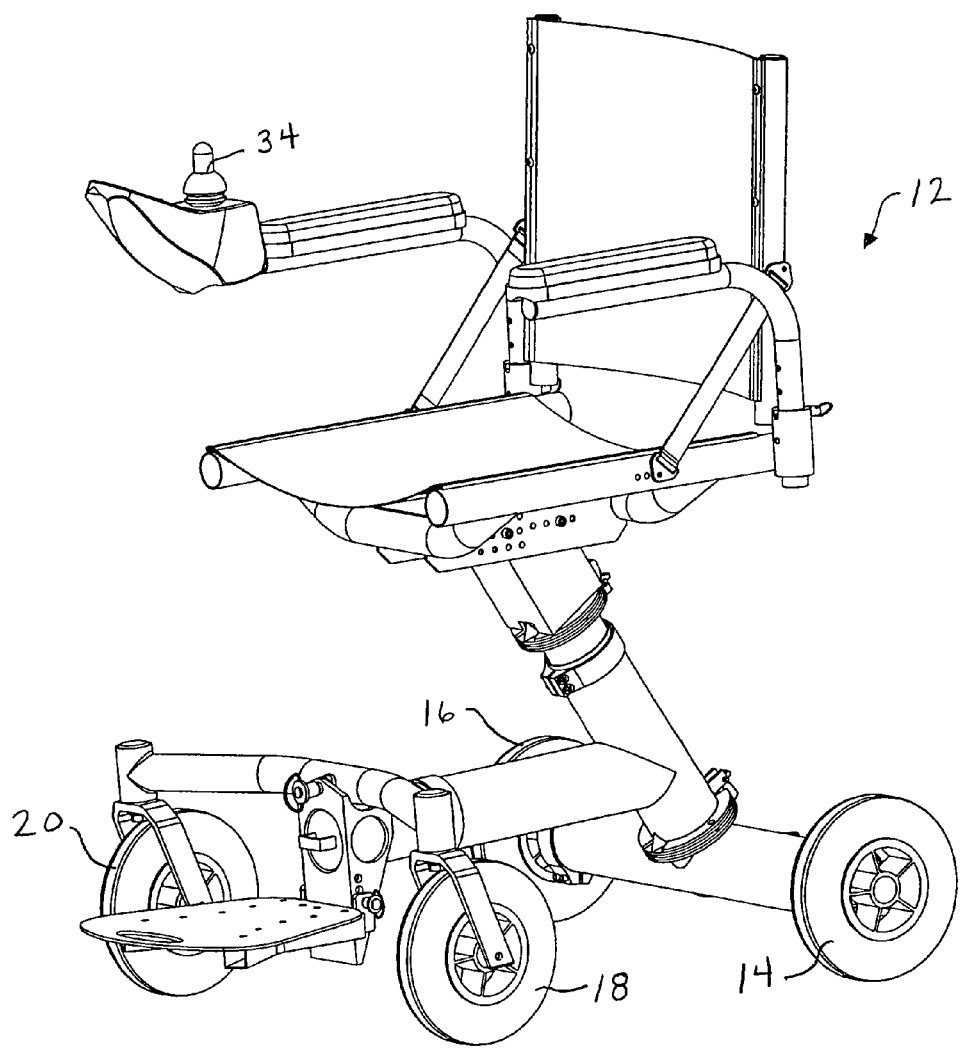
FIG. 1 is perspective view of a modular wheelchair in accordance with one embodiment of the invention.

With reference to FIG. 1, one embodiment of a modular wheelchair is illustrated as having rear drive wheels 14, 16 and front caster wheels 18, 20. However, the coupling of different modules to be described below may be used for wheelchairs in which the drive wheels are in front of the caster wheels or other types of free-rolling wheels. Conventionally, there are a pair of anti-tip wheels behind the drive wheels (as will be described below), so that the drive wheels are in actuality center wheels.

Figure 2:
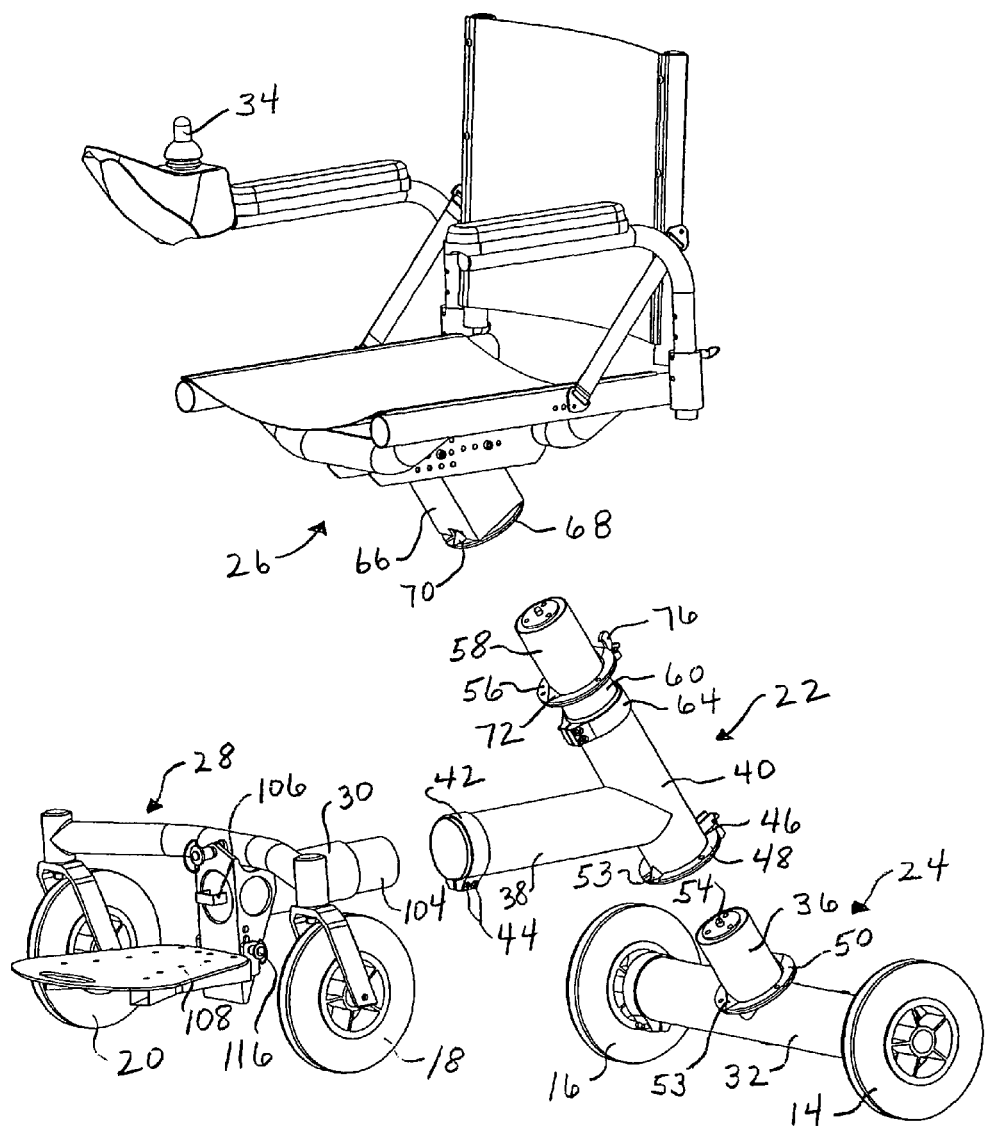
FIG. 2 is a partially exploded view of the wheelchair of FIG. 1.

The wheelchair 12 FIG. 1 is shown in a partially disassembled condition in FIG. 2. The different modules include a chassis 22, a drive assembly 24, a seat assembly 26, and a wheels assembly 28. While not shown in FIG. 2, a telescoping extension 30 may be considered as a part of the chassis 22, since it is tubular and cooperates with other elements of the chassis to determine the length of the wheelchair. More specifically, the telescoping extension may be used to change the distance between the caster wheels 18, 20 and the drive wheels 14, 16. Such wheelbase length adjustments are beneficial for accommodating larger users, as well as wheelchair use at higher speeds or in various terrains.

Figure 3:
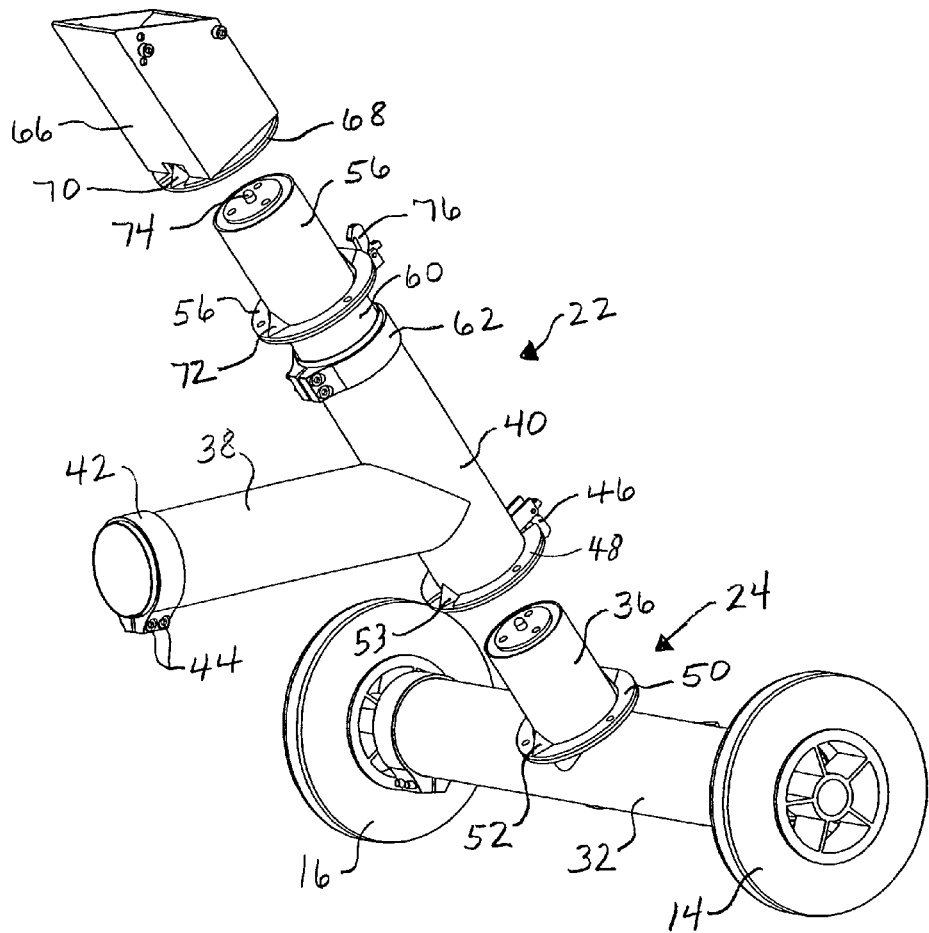
FIG. 3 is an exploded view of one embodiment of the plug/receiver mechanical couplings of a chassis to a drive assembly and seat assembly of FIG. 2.

Referring to FIGS. 2 and 3, the drive assembly 24 is shown as including the drive wheels 14, 16 at opposite ends of a tubular housing 32. While the housing may have a different shape, there are advantages to providing a tubular housing. The continuously smooth shape allows easy handling. Moreover, the wheelchair 12 of FIG. 1 preferably is able to fit within a conventionally sized suitcase once the modules have been dissembled. The tubular configuration of the housing 32 reduces the chances that the drive assembly will damage or disfigure other components within the suitcase or other area of transportation. More often, the dissembled wheelchair will be transported in an area of a vehicle, such as the trunk of a car.

As one example, the diameter of the tubular housing 32 may be 7.62 centimeters. In one preferred embodiment, the tubular housing contains the motors and gearboxes for operating the drive wheels 14, 16. The drive wheels are operatively associated with different motors and different gearboxes. The motors can then be operated to provide drive in the same direction or in opposite directions. By driving the wheels in opposite directions, the wheelchair is able to turn on its axis, if desired. The motors are controlled by operation of a joystick 34 (FIGS. 1 and 2), in a manner known in the art. Manipulation of the joystick may be used to control direction and speed.

While there are many advantages to use of an electric wheelchair, a disadvantage of a conventional electric wheelchair involves difficulty in transportation. By locating the motors and gearboxes within the housing 32, the drive assembly 24 is easily carried with minimal exposure of working components which could soil or stain the clothing of a person carrying the drive assembly.

Projecting from the exterior of the tubular housing 32 of the drive assembly 24 is a plug 36. The function of the plug is to provide a quick-release coupling to the chassis 22, as will be described fully below.

Figure 4:
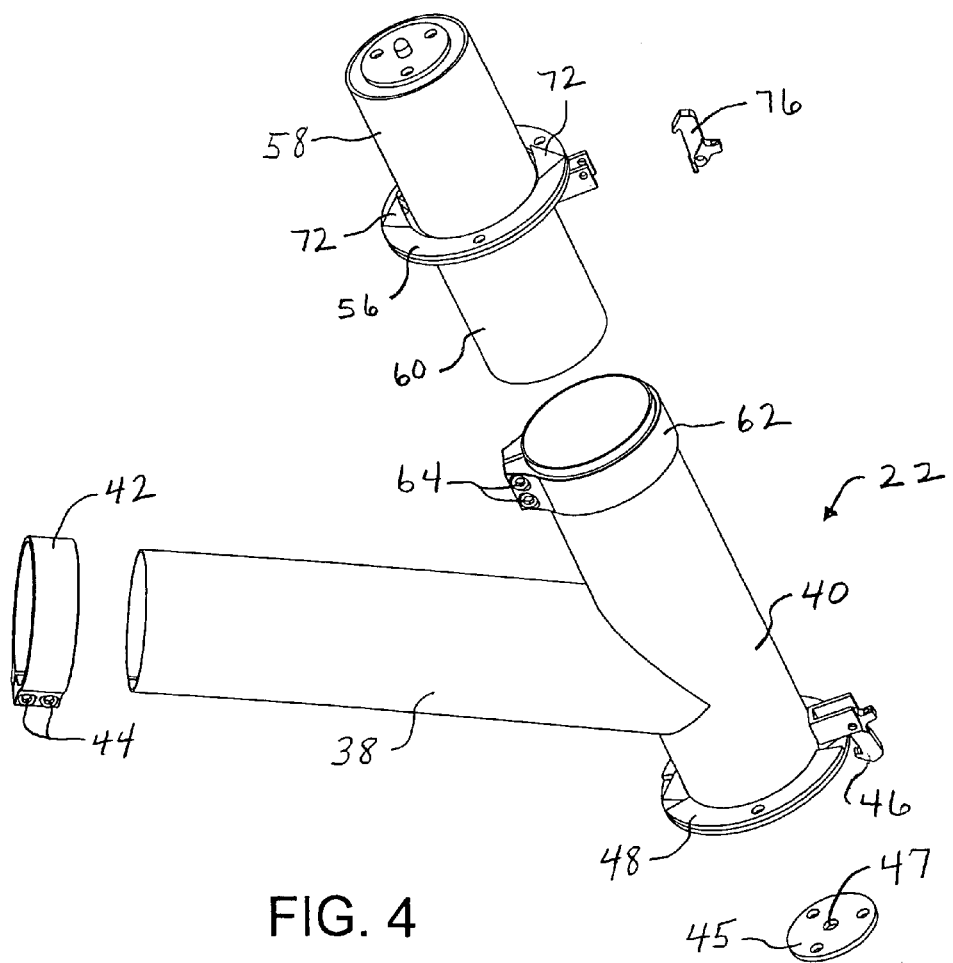
FIG. 4 is an exploded view of the chassis of FIG. 3.

In FIGS. 2, 3, and 4 the chassis 22 is shown as being a pair of tubular frame members 38, 40. The frame members are "in-line," which is defined here as being an arrangement in which each frame member of the chassis is substantially centered to a center plane through the chassis. The frame members are "substantially" centered, since any variation is either unintentional or so small that each frame member remains within the width dimension of the frame member having the largest diameter. Thus, if the width of each frame member is disregarded, the chassis may be considered to be two-dimensional, having only length and height dimensions.

While only two tubular frame members 38, 40 are shown as forming the chassis 22, other embodiments may include additional frame members. For example, greater strength may be achieved by providing a third frame member that extends from the horizontal frame member 38 to the inclined frame member 40. With the third frame member, the chassis is a triangular truss structure. Welding may be used to connect the various frame members. The tubular frame members have a relatively large diameter, often two or three times that of tubing used in prior art wheelchairs. A suitable diameter is 6.35 centimeters. For embodiments, in which the third frame member is added, the "brace" frame member may have a smaller diameter. As with the tubular housing 32 the drive assembly 24, the tubular shape is preferred, since it best accommodates storage and carrying.

At the forwardmost end of the horizontal frame member 38 is a clamp 42. Referring specifically to FIG. 2, the clamp secures the position of the telescoping extension 30 relative to the horizontal frame member 38. The telescoping extension has a diameter which readily fits within the interior of the horizontal frame member. When the mounting hardware 44 of the clamp is loosened, the telescoping extension may be moved to the position preferred by a particular user. The mounting hardware is then tightened to ensure that undesired movement does not occur during normal use of the wheelchair. While the illustration of FIG. 2 permits only a small degree of telescoping, the length of the telescoping extension 30 is limited only by the length of the horizontal frame member 38. There may also be features such as holes in each tube to receive pins to provide alignment and safety back-up for the clamp.

The plug 58 of FIGS. 2, 3, and 4 of the drive assembly 24 provides the mechanical coupling of the chassis 22 to the drive assembly. The plug fits within the interior of the frame member 40 so as to achieve a single mechanical coupling of the two modules. When the plug reaches its seated position, axial movement (decoupling movement) of the plug relative to the receiver is resisted in one direction by the surface-to-surface contact of the two parts and is resisted in the opposite direction by gravitational force. Additionally, the plug and receiver include cooperative surface features which achieve self-aligning and self-seating of the plug within the receiver, even with manufacturing tolerances. With the plug in the seated position, lateral (radial) movement of the plug within the receiver is resisted, as is relative rotation between the plug and the receiver (both rotation about the axis of the plug and rotation of the axis of the plug relative to the axis of the receiver). In the preferred embodiment, the plug has different geometries at its forward and rearward ends. Similarly, the receiver portion of the frame member 40 has different end geometries. On FIG. 4, a member 45 includes recess 47 that forms an end geometry of the receiver (the end geometry opposite to the flange 48) when located within the frame member 40. While the end geometries of the plug 36 are different, they are each compatible with one of the end geometries of the receiver. The complimentary geometries provide a secure fit, but a latch 46 may be included in order to lock the plug/receiver mechanical coupling to prevent decoupling during lifting of the wheelchair or during uncommon use (such as a sudden impact). Normally, the weight of a user is sufficient to ensure that unintentional decoupling will not occur.

As one possibility, the plug 36 may be welded to the tubular housing 32 of the drive assembly. Similarly, a flange 48 may be welded to the bottom of the frame member 40. In an alternative arrangement, the plug 36 is a component of the chassis 22, so that the receiver is into the interior of the tubular housing 32.

One possibility of a plug/receiver mechanical coupling is to form the plug 36 so as to have an increase in diameter at its base, while the inside diameter of the receiver hole is reduced at its top (as viewed in the orientation of the frame member 40 in FIGS. 2, 3, and 4.) With such an arrangement of diameters, there will be a loose fit between the plug and the receiver, until the plug reaches its seated position. Moreover, the opening of the receiver and the top of a flange 50 at the base of the plug 36 may have compatible surface features that mate when the plug reaches its seated position. The latch 46 is included to prevent inadvertent disconnection under conditions of an uneven road surface, braking, and cornering.

In the embodiment illustrated in FIGS. 2 and 3, variations in the diameter of the plug 36 and/or the receiver are not necessary. Instead, at the top of the plug is at least one surface feature 54. The surface features fit within compatible surface features at the end of the receiver when the plug is in its seated position. Moreover, the flange 50 at the base of the plug includes raised surface features 52, while the flange 48 at the bottom of the receiver includes corresponding recessed surface features 53 that resist rotational movement after the plug reaches its seated position within the receiver. Rotational movement of the plug is resisted in multiple dimensions (e.g., rotation of the plug about its axis and rotation of the plug axis about the axis of the receiver). Moreover, during the process of coupling the chassis 22 to the drive assembly 24, the surface features function to achieve self-aligning and self-seating.

A functionally identical plug/receiver mechanical coupling is used as a releasable inner connection of the seat assembly 26 to the chassis 22. The only significant difference is that this mechanical coupling enables adjustability in the height of the seat assembly relative to the chassis. Rather than having a plug flange 56 welded to the bottom of a plug 58, the flange is located along the central area of the plug. Thus, there is a cylindrical portion 60 extending below the plug flange. This cylindrical portion is dimensioned to be received within the frame member 40. A clamp 62 with mounting hardware 64 is tightened after the cylindrical portion 60 has been positioned in a location preferable to the user. In FIGS. 2 and 3, the cylindrical portion 60 is shown as being partially exposed, so that the plug flange 56 is spaced apart from the clamp 62.

At the bottom of the seat assembly 26 is a bracket 66 having a receiver flange 68 welded to its bottom. The receiver flange includes recessed surface features 70 that correspond to raised surface features 72 on the plug flange 56. When the plug 58 reaches its seated position with the receiver within the interior of the bracket 66, the surface features 70 and 72 are mated and prevent rotational movement of the seat assembly relative to the chassis. As with the other plug/receiver mechanical coupling, the plug includes one or more top raised surface features 74 that fit tightly to features at the end of the receiver, so as to resist axial movement when the plug is properly seated. It should be noted that the arrangement of the plug and the receiver may be reversed (as well as locations of the relevant surface features), so that the plug becomes part of the seat assembly and the receiver becomes part of the chassis. It should also be noted that this mechanical coupling also includes a safety latch 76 for securing the two flanges 56, 68 after the seat assembly is properly positioned.

Figure 5:
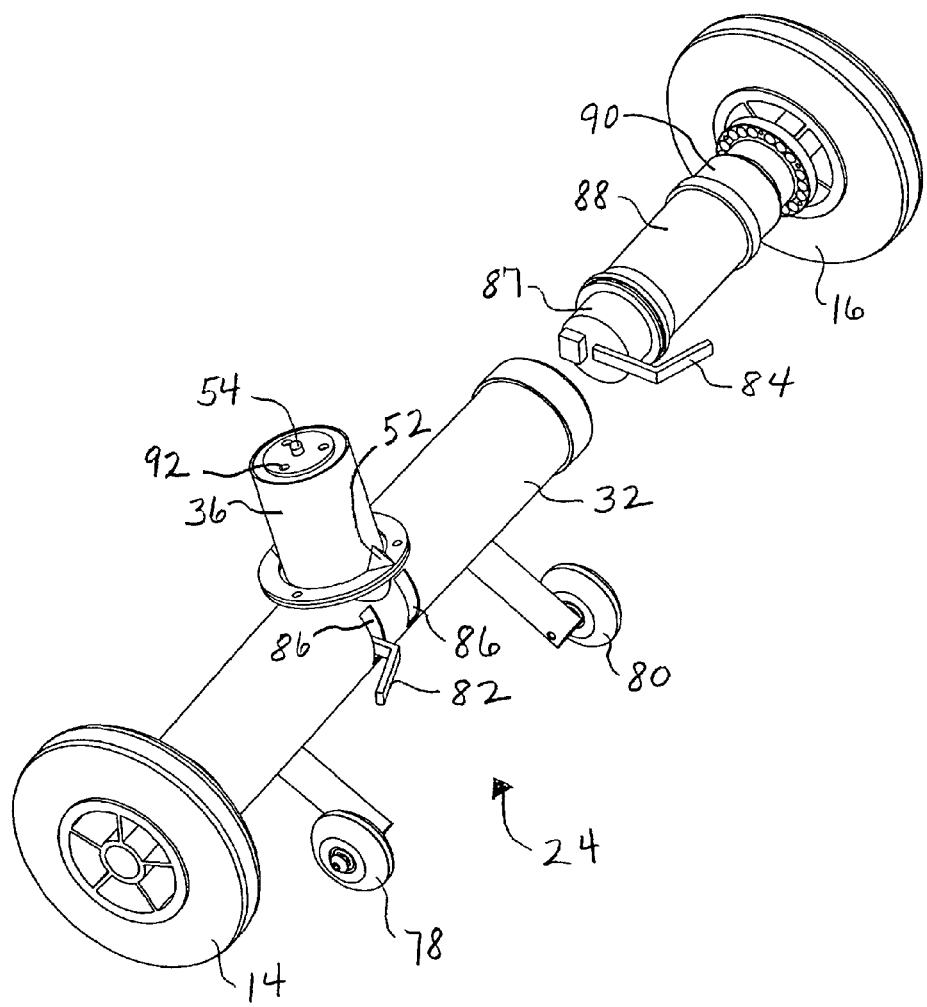
FIG. 5 is a partially exploded perspective view of the drive assembly of FIGS. 1-4.

FIG. 5 is a rear perspective view of the drive assembly, but with some components being removed from the interior of the tubular housing 32. As previously noted, electric wheelchairs often include anti-tilt wheels 78, 80. Another known feature is the use of foot-controlled brake release members 82, 84. Brakes are provided such that the brakes are applied anytime that the motors are not powered, which is particularly useful automatic hill-holding. In the embodiment of FIG. 5, the brake-release members 82, 84 are manual levers that extend through a pair of rear openings 86 within the tubular housing so as to disengage the motor from the drive wheels, thereby allowing the wheelchair to be manually driven. In the partially exploded view of FIG. 5, the second brake-release member 84 is shown removed from its opening 86.

The elements which have been removed from the tubular housing 32 of the drive assembly 24 include a brake element 87 the motor 88 and the gearbox 90 that control the drive wheel 16. An identical motor and gearbox for the other drive wheel 14 are not shown. The small drive wheels 14, 16 facilitate packing and allow efficient high-speed motors to be utilized. In one preferred embodiment, the gearboxes are compound planetary gearboxes. The gearboxes are secured by banded clamps, rendering a very compact package. However, there are embodiments in which the motors are connected directly to the drive wheels, rather than through gearboxes.

In one preferred embodiment, the gearboxes 90 and motors 88 have axes that are coaxial with the drive wheels 14, 16. This coaxial arrangement occurs with the use of compound planetary gearboxes. Alternatively, the axes of the motors, gearboxes, and wheels may remain an angular alignment, but are parallel rather than coaxial. For example, the gearboxes may utilize a spur gear relationship. For either angular alignment of the axes, the benefit is that the components can be readily housed within the tubular housing and can efficiently drive the wheels.

Active cooling may be provided for the motors 88, but this is not critical. Intake air enters through vent holes. For example, rather than having a pair of surface features at the top of the plug 36, FIG. 5 shows a single surface mating feature and shows an intake opening 92. Cooling air travels through the attached chassis, through the vent hole 92 to the motors 88. Exit openings are included.

Figure 6:
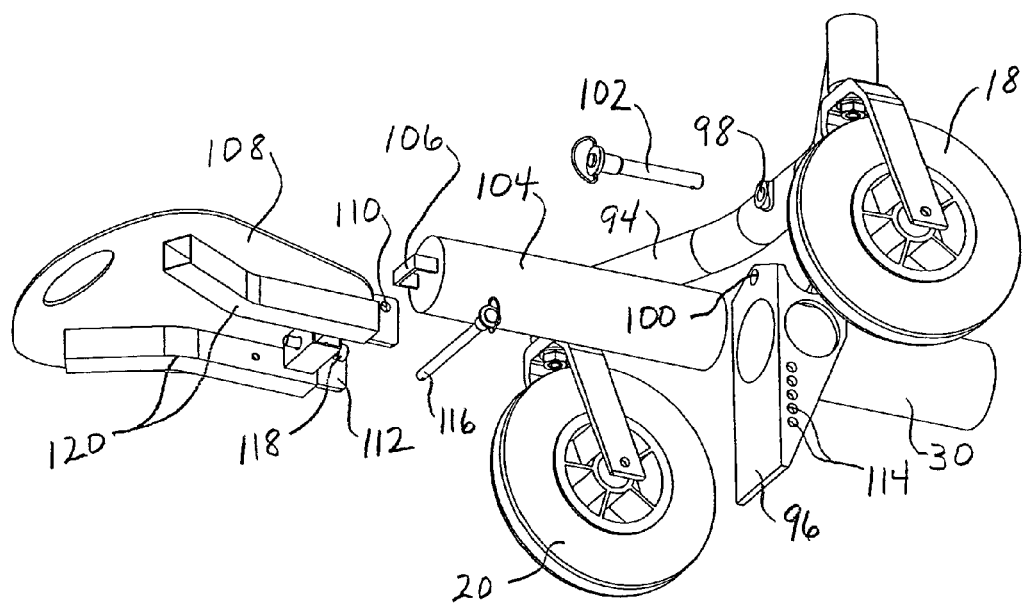
FIG. 6 is an exploded view of couplings to a telescoping extension for the chassis of FIG. 1.

Referring now to FIGS. 2 and 6, a number of components may be connected to the adjustable telescoping extension 30. In addition to the two caster wheels 18, 20 the wheels assembly 28 includes a front subframe 94. The caster wheels are supported at opposite ends of the subframe in a manner conventional in the art. Attached to the end of the telescoping extension 30 is a mounting bracket 96. The subframe may be connected to the mounting bracket by aligning a hole 98 in the subframe with a pair of holes 100 in the mounting bracket and passing a coupling pin 102 through the aligned holes. It follows that removal of the wheels assembly merely requires extracting the coupling pin 102 and lifting the assembly. In a preferred embodiment, the wheels assembly pivots about the coupling pin. For example, the pivot action may be resiliently constrained by elastomers (not shown) mounted to flanges. This allows all four wheels 14, 16, 18, and 20 to remain in contact with the ground when traveling on an uneven surface.

A lightweight battery 104 may be mounted to reside within one or more of the frame members. In the embodiment of FIGS. 2 and 6, the battery 104 may be inserted or extracted through the mounting bracket 96. At one end of the battery is a handle 106. At the opposite end, exposed electrical contact (not shown) may be used to electrically connect the battery to the motors and other components which require power.

A footrest 108 is detachably mounted to the mounting bracket 96 at the end of the telescoping extension 30. When holes 110 through projecting brackets 112 of the footrest are aligned with one set of holes 114 with the mounting bracket 96, a coupling pin 116 is passed through the aligned holes to support the footrest. The selection of holes 114 for alignment with the footrest holes 110 is based upon user preference. For example, a user with longer legs is likely to select a hole at the bottom of the series of holes of the mounting bracket. The coupling pins 102, 116 may be quick-release ball pins. Once connected, the footrest is still able to pivot. A stop member 118 is adjustably positioned to contact the face of the mounting bracket when the footrest is pivoted to its normal-use position. As shown in FIG. 6, the footrest is fabricated as a thin plate with lightweight truss work 120.

Figure 7:
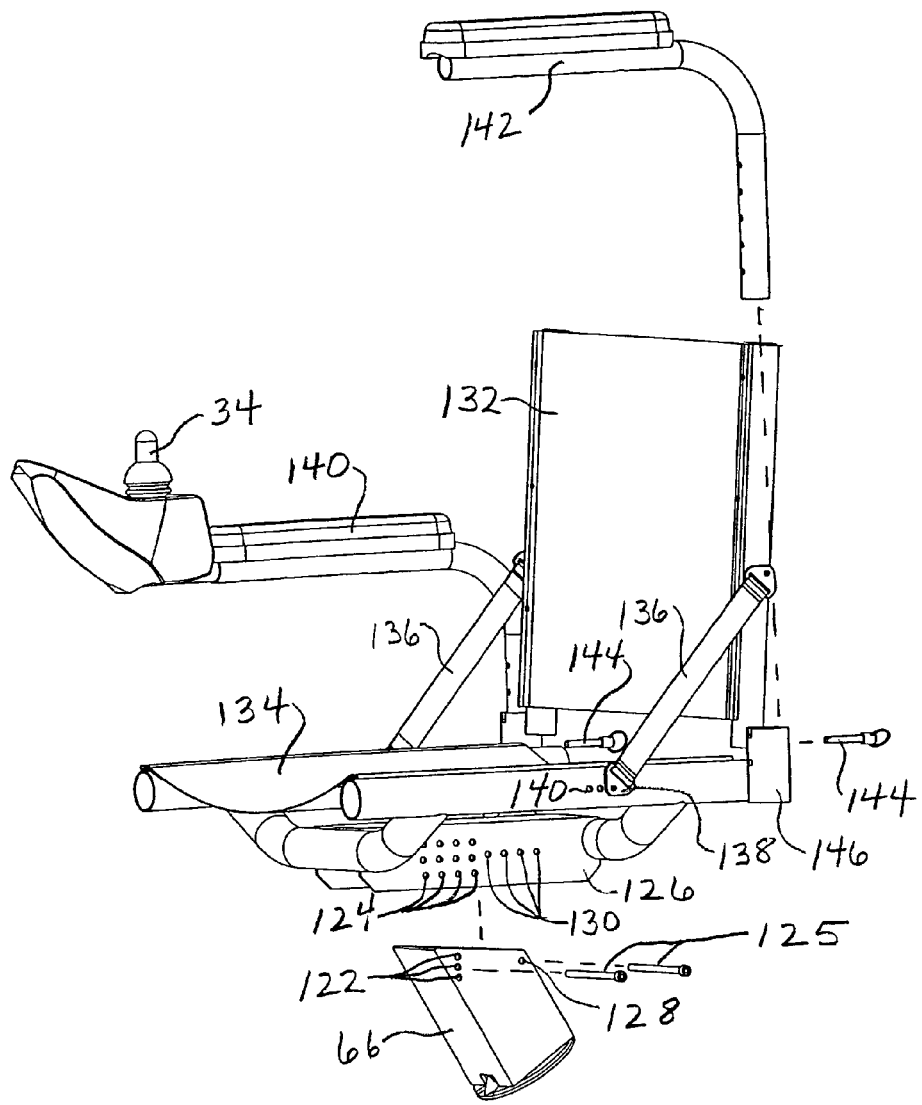
FIG. 7 is a partially exploded perspective view of the seat assembly of FIG. 1.

Referring now to FIG. 7, the seat assembly is shown as including the bracket 66 that is used in connecting the seat assembly to the chassis. Any one or more of a set of three vertically arranged holes 122 within the bracket 66 may be aligned with holes 124 within an undercarriage 126 of the seat. In like manner, a hole 128 within the bracket may be aligned any one of the horizontally arranged holes 130 of the undercarriage. This enables a user to select a forward or rearward position of the seat relative to the bracket 66. That is, a fore or aft selection is enabled. Additionally, the tilt of the chair may be adjusted by selection of a venier arrangement of alignment of holes 122 to holes 124. Screws 125 and nuts (not shown) or ball pins may be inserted after each selection of hole alignments. The angle of a back portion 132 relative to a seat portion 134 is also adjustable. Straps 136 have ends 138 that can be connected to any hole 140 within a series of holes to provide the adjustability.

The seat assembly also includes a pair of armrests 140, 142. The joystick 34 is attached to one of the armrests and is linked to the controlled apparatus (such as motors) using techniques known in the art. Typically, a wire harness connects the joystick. Since the wheelchair is modular, the wire harness should be detachable. As an alternative, the signals representing manipulation of the joystick may be transmitted wirelessly, such as by using Bluetooth technology or through electrical contacts integral to the coupling between each module. Ball pins 144 connect the armrest through tubes 146 of the seat assembly. The height of the armrest relative to the seat portion 134 is adjustable by selection of armrest holes through which the ball pins are passed.

Figures 8, 9:
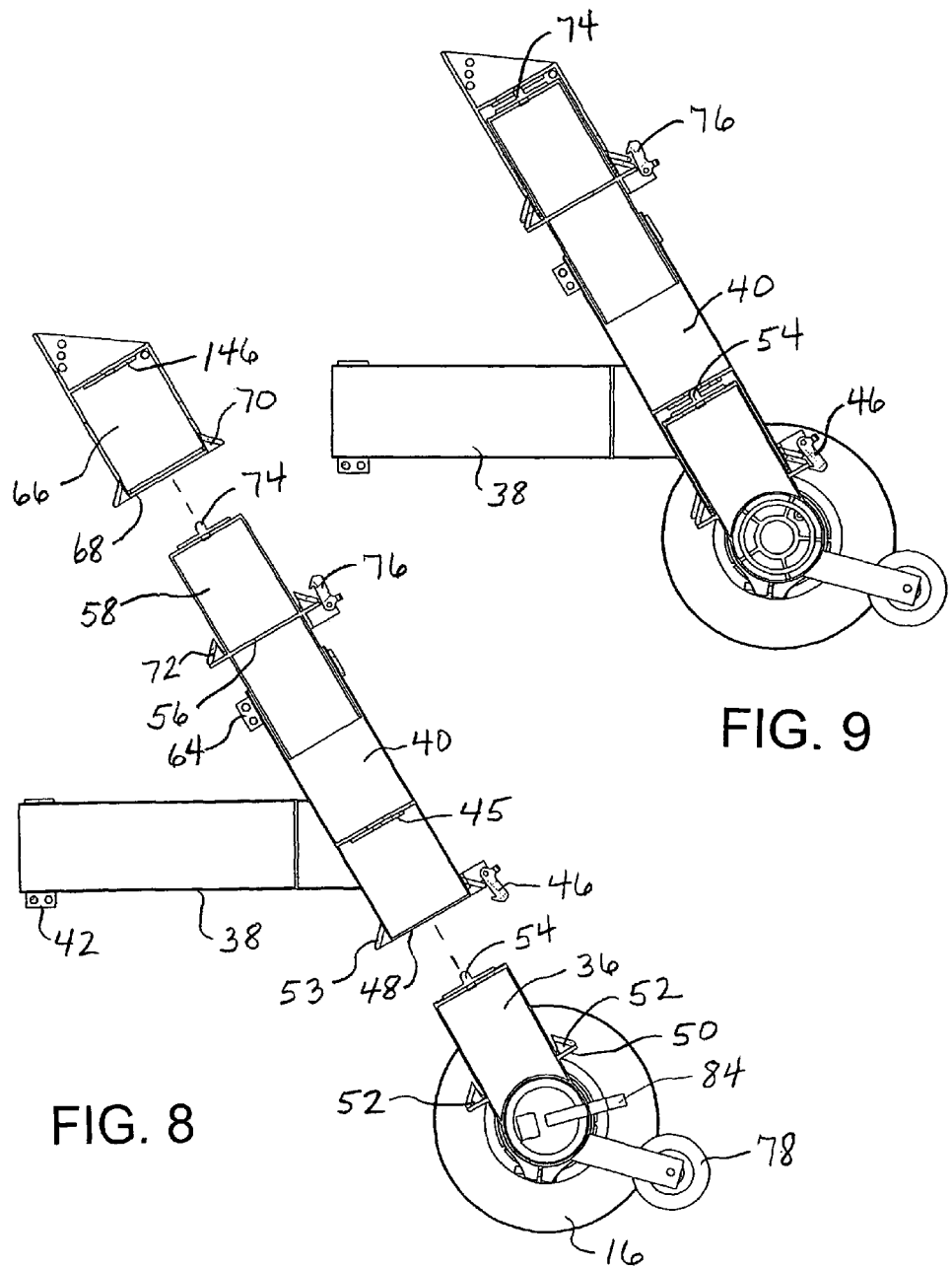
FIG. 8 is an exploded cross sectional view of two plug/receiver couplings of components of FIG. 2.
FIG. 9 is an assembled view of the components of FIG. 8.

FIGS. 8 and 9 illustrate the assembly of components. FIG. 8 is an exploded view, while FIG. 9 is an assembled view. Referring firstly to FIGS. 3 and 8, the drive assembly 24 is connected to the chassis 22 using the plug 36. At the top of the plug is a projecting surface feature 54 and along the plug flange 50 are surface features 52 that provide self-alignment and self-centering when connected to surface features 53 on the receiver flange 48. The surface features 52, 53 are compatible in shape and have two dimensions of surface slope.

In addition to the compatible surface features 52, 53 at the flanges 48, 50, the plug/receiver mechanical coupling includes the mating of the projecting surface feature of the plug 36 to the recess 47 (in FIG. 4) of member 45. When the components are connected as shown in FIG. 9, gravitational force induces the components to remain in position, but the safety latch prevents the two flanges from separating. Similarly, the bracket 66 that is attached to the seat assembly is connected to the chassis by means of a plug/receiver mechanical coupling. The plug 58 includes the projecting surface feature 74 that is aligned with a central recess within a member 146 that partially defines the receiver. The receiver is also defined by the flange 68 having surface features 70. The surface features 70 of flange 68 are compatible with the surface features 72 of plug flange 56. When the plug is properly positioned within the receiver following the self-alignment and self-centering achieved by the various surface features (particularly the surface features 70 and 72 which are sloped in two dimensions), the latch 76 secures the two flanges. Preferably, the two latches 46 and 76 are spring biased into the lock positions shown in FIG. 9, but are linked to each other by a durable string or wire which simultaneously releases both latches merely by applying pressure to the link.

During the coupling process, the surface features provide the self-alignment and self-seating. After the components are properly coupled, the surface features continue to perform important functions. The projections 54 and 74 into the corresponding recesses of the receiver members 45 and 146 restrict lateral movement of the plugs 36 and 58 relative to the receivers. Additionally, the coupling of the plug flange surface features 52 and 72 with the receiver flange surface features 53 and 70 restrict relative rotation between the plugs and the receivers (both rotation about the axis of the plug and rotation of the plug axis relative to the receiver axis).

Figure 10:
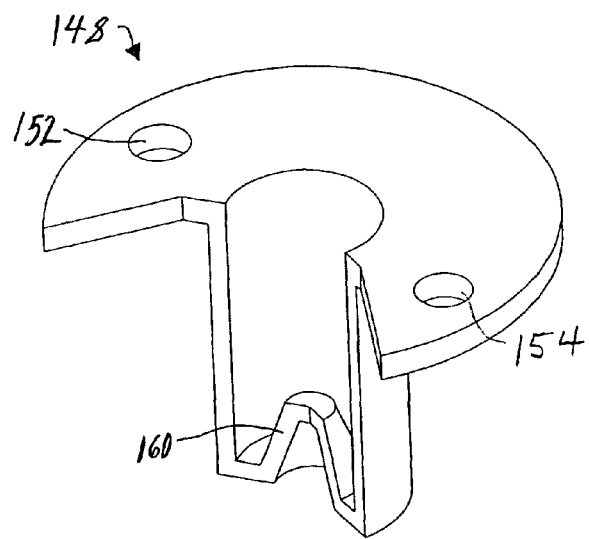
FIG. 10 is a partially cut away view of a plug in accordance with an alternative preferred embodiment.
Figure 11:
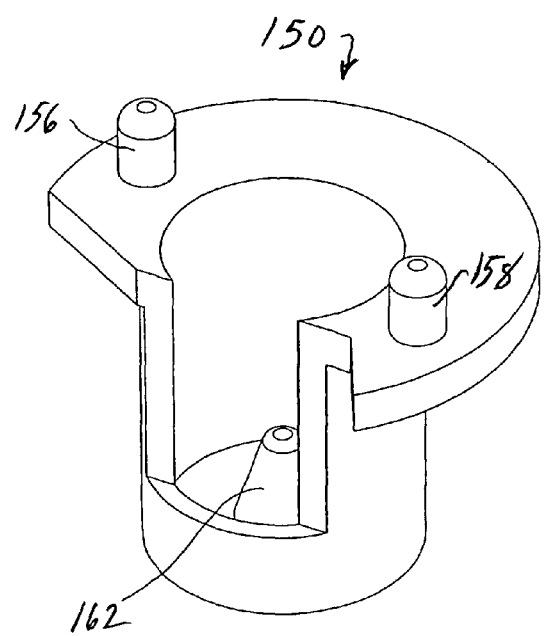
FIG. 11 is a partially cut away view of a receiver compatible with the plug of FIG. 10.

FIGS. 10 and 11 illustrate partially cut away views of a plug 148 and receiver 150 in accordance with an alternative embodiment of a plug/receiver mechanical coupling for a modular wheelchair 12 of FIG. 1. In this embodiment, the plug includes a pair of holes 152, 154 that are positioned and dimensioned to receive a pair of projecting surface features 156, 158 on the receiver. The other end geometries of the plug and receiver are defined by the frustroconical shape of a plug feature 160 and a corresponding feature 162 at the bottom of the receiver. In this embodiment, the roles of the end geometries are reversed relative to the description of the embodiment of FIGS. 8 and 9. The surface features 160, 162 provide the self-alignment and self-seating. The features are self-aligning in a sense that precision assembly alignment by the user and precision manufacturing tolerances are not required in order to obtain a connector that seats without any "play" at one end and very little play at the end geometry of features 152, 154, 156, and 158. It is relatively easy to fabricate close tolerances for a pin-and-hole combination. The projection of the two receiver features 156, 158 through the holes 152, 154 of the receiver minimizes rotation about the axes of the mechanical coupling and minimizes lateral (radial) motion at the same time. Additionally, rotation of the axis of the plug 158 relative to the axis of the receiver 150 is minimized.

Figure 12:
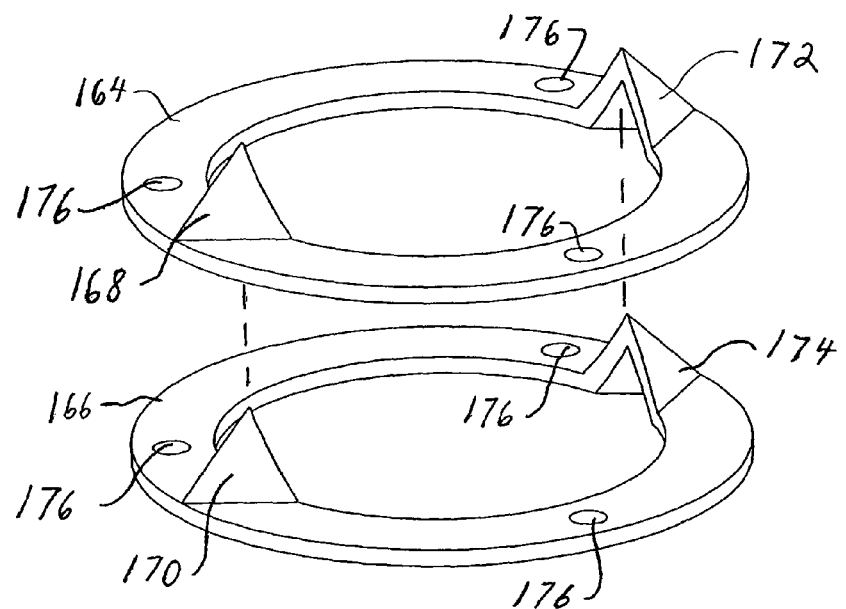
FIG. 12 is a side perspective view of an embodiment in which two members are configured to be self-aligning, self-seating and movement restricting.

FIG. 12 represents an embodiment in which corresponding members 164, 166 include compatible surface features 168, 170, 172, 174 which are configured to achieve the self-aligning, self-seating, and movement-restricting capabilities that were previously described. The surface features include slopes in two dimensions. The two members are manufactured separately from other components of the modular wheelchair, but then may be fastened onto flanges (using screw holes 176) which are included onto frame members. This provides some adjustability in order to compensate for manufacturing tolerances.

What is claimed is:

1. A modular wheelchair comprising:
    a drive module having drive wheels and a pair of motors;
    a wheels module having support wheels;
    a seat module having seat means for supporting a person;
    a chassis module defined by a plurality of frame members which include an inclined frame member and are substantially centered to a vertical center plane through said chassis module; and
    coupling means for releasable interconnection of said drive, seat, chassis, and wheels modules, said coupling means including a single plug/receiver mechanical coupling of said chassis module to said drive module at a first end of said inclined frame member in which a receiver is configured such that insertion of a plug to a seated position resists lateral movement of said plug within said receiver and resists relative rotation between said plug and said receiver, and said coupling means including a second mechanical coupling releasable connecting said seat module to said chassis module at a second, opposed end of said inclined frame member.

2. The modular wheelchair of claim 1 wherein each of said receiver and said plug includes different first and second end geometries, said first end geometries of said receiver and said plug being compatible to resist said lateral movement, said second end geometries being compatible to both resist said relative rotation and said lateral movement, said plug being restricted from further insertion when in said seated position.

3. The modular wheelchair of claim 2 wherein said second end geometries of said plug and said receiver are in full engagement only upon said plug reaching said seated position.

4. The modular wheelchair of claim 2 wherein each said frame member of said chassis module is tubular and wherein said plug/receiver mechanical coupling is a mating of interlocking parts at an end of a specific said frame member, said center plane through said chassis module being along a lengthwise direction of said modular wheelchair.

5. The modular wheelchair of claim 2 wherein said second mechanical coupling is operationally the same as said single plug/receiver mechanical coupling of said chassis module to said drive module.

6. The modular wheelchair of claim 1 wherein said drive module includes an axial, frame member that houses a pair of gearboxes and two motors such that said gearboxes and motors are in angular alignment with said drive wheels, each said gearboxes being operatively coupled between one of said motors and one of said drive wheels.

7. The modular wheelchair of claim 1 wherein said frame members of said chassis module are tubular and include a generally horizontal frame member and a telescoping extension which is extendable and retractable relative to said generally horizontal frame member.

8. The modular wheelchair of claim 7 wherein said telescoping extension includes a quick-release coupling to said wheels module, said quick-release coupling including a coupling pin dimensioned to pass through aligned holes within said wheels module and said telescoping extension.

9. The modular wheelchair of claim 7 wherein said telescoping extension includes a second quick-release coupling, said modular wheelchair including a footrest module, said second quick-release coupling including a second coupling pin dimensioned to pass through aligned holes within said footrest module and said telescoping extension.

10. The modular wheelchair of claim 1 further comprising a battery coupled to power said motors, said battery being housed within one of said frame members.

11. The modular wheelchair of claim 1 further comprising a safety latch connected to secure said plug within said receiver.

12. A modular wheelchair comprising:
    a drive module having drive wheels and at least one motor operatively coupled to at least one gearbox to drive said modular wheelchair;
    a seat module having seat means for supporting a person;
    a chassis module defined by a plurality of frame members which are substantially centered to a vertical center plane through said chassis module and include an inclined frame member; and
    coupling means for releasable interconnection of said drive and seat modules to opposed ends of said inclined frame member of said chassis module, said coupling means including a single plug/receiver mechanical coupling of said chassis module to said drive module in which a receiver is configured such that insertion of a plug in an axial direction to a seated position resists radial movement of said plug relative to said receiver and resists relative rotation between said plug and said receiver, each of said receiver and said plug including different first and second end geometries, said first end geometries of said receiver and said plug being compatible to resist said radial movement, said second end geometries being compatible to resist both said radial movement and said relative rotation, said plug being restricted from further said insertion in said axial direction upon reaching said seated position.

13. The modular wheelchair of claim 12 further comprising a pair of caster wheels cooperative with said drive wheels to support said modular wheelchair.

14. A modular wheelchair comprising:
a chassis having frame members which are aligned along a vertical center plane of said chassis, said frame members being tubular and including an inclined frame member;
a drive assembly having first and second drive wheels at opposite ends of a tubular housing, said drive assembly including first and second motors and first and second gearboxes located within said tubular housing, said gearboxes having axes in angular alignment with axes of said drive wheels, said first drive wheel being operatively associated with said first motor and said first gearbox, said second drive wheel being operatively associated with said second motor and said second gearbox, said drive assembly having a first releasable coupling to said inclined frame member of said chassis;
a seat assembly having a seat, said seat assembly having a second releasable coupling to said inclined frame member of said chassis; and
a wheels assembly having a pair of caster wheels, said wheels assembly having a third releasable coupling to said chassis.

15. The modular wheelchair of claim 14 further comprising a footrest assembly having a quick-release coupling to one of said drive assembly and said chassis to position a footrest for access by a user.

16. The modular wheelchair of claim 14 wherein said frame members of said chassis include a generally horizontal member and a telescoping extension projecting therefrom, said telescoping extension being adjustable in position relative to said generally horizontal member to vary a length of said chassis.

17. The modular wheelchair of claim 16 wherein said third releasable coupling includes a coupling pin extending through holes within said wheels assembly and said telescoping extension.

18. The modular wheelchair of claim 14 wherein said first releasable coupling is a mating of an end of said chassis with a center area of said tubular housing of said drive assembly, said end having a shape that is compatible with surface features which are integral to said tubular housing to resist all of (1) relative rotation between components of said first releasable coupling, (2) relative radial movement between said components, and (3) relative axial movement of said components when said modular wheelchair is in use.

19. The modular wheelchair of claim 18 wherein said first releasable coupling further includes a safety latch means for locking said end within said receiver.

20. The modular wheelchair of claim 19 wherein said second releasable coupling of said seat assembly is structurally the same as said first releasable coupling, said second releasable coupling including a second safety latch.

21. The modular wheelchair of claim 18 wherein all said frame members of said chassis are aligned to said vertical center plane of said chassis, said first, second, and third releasable couplings all being intersected by said vertical center plane.

* * * * *